United States Patent
Zhao et al.

(10) Patent No.: US 10,589,246 B2
(45) Date of Patent: Mar. 17, 2020

(54) HIGH TEMPERATURE INLET DISTRIBUTOR

(71) Applicant: KELLOGG BROWN & ROOT LLC, Houston, TX (US)

(72) Inventors: Nan Zhao, Houston, TX (US); William E. Phillips, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 15/047,429

(22) Filed: Feb. 18, 2016

(65) Prior Publication Data

US 2016/0250610 A1     Sep. 1, 2016

Related U.S. Application Data

(60) Provisional application No. 62/121,001, filed on Feb. 26, 2015.

(51) Int. Cl.
    *B01J 4/00*    (2006.01)
    *B01J 8/18*    (2006.01)

(52) U.S. Cl.
    CPC ........... *B01J 8/1818* (2013.01); *B01J 4/002* (2013.01); *B01J 8/1827* (2013.01); *B01J 8/1872* (2013.01); *B01J 8/1863* (2013.01); *B01J 2208/00495* (2013.01); *B01J 2208/00752* (2013.01); *B01J 2208/00902* (2013.01)

(58) Field of Classification Search
    None
    See application file for complete search history.

(56) References Cited

U.S. PATENT DOCUMENTS

| | | | | |
|---|---|---|---|---|
| 3,101,249 A | * | 8/1963 | Priscu | C22B 1/08 422/224 |
| 3,740,865 A | * | 6/1973 | Laguilharre | B01D 1/18 34/591 |
| 3,839,017 A | * | 10/1974 | Schempp | C21C 5/34 75/530 |
| 3,887,131 A | * | 6/1975 | Bourne | B01D 53/34 239/110 |
| 3,982,605 A | * | 9/1976 | Sneckenberger | B05B 1/005 181/247 |
| 4,060,041 A | * | 11/1977 | Sowards | F23G 5/30 110/245 |

(Continued)

FOREIGN PATENT DOCUMENTS

| | | | | |
|---|---|---|---|---|
| DE | 4105280 A1 | * | 8/1991 | ........... C10J 3/66 |
| JP | 59205514 A | * | 11/1984 | |
| SU | 1813189 A3 | * | 4/1993 | |

OTHER PUBLICATIONS

Machine translation of RU 1813189 (Apr. 1993). Retrieved from Espacenet on Jun. 19, 2019. (Year: 2019).*

*Primary Examiner* — Jennifer A Leung
(74) *Attorney, Agent, or Firm* — Gary M. Machetta

(57) ABSTRACT

A system for processing one or more materials includes a processor having a shell defining a chamber and a plurality of serially stacked pipe assemblies. Each pipe assembly includes a header having at least one substantially straight pipe section receiving a fluid; and a plurality of nozzles in fluid communication with and projecting downwardly from the header. The nozzles direct the fluid into the chamber of the processor.

12 Claims, 3 Drawing Sheets

(56) References Cited

U.S. PATENT DOCUMENTS

| | | | | |
|---|---|---|---|---|
| 4,460,130 | A | * | 7/1984 | Baumann ............... B01J 8/1818 201/41 |
| 4,682,985 | A | * | 7/1987 | Kohl ......................... C10J 3/57 162/30.11 |
| 4,773,918 | A | * | 9/1988 | Kohl ......................... C10J 3/20 162/30.11 |
| 5,173,093 | A | * | 12/1992 | Johnson ............... B01D 53/504 95/224 |
| 6,284,189 | B1 | * | 9/2001 | Pavlicevic ............ C21C 5/4606 239/601 |

* cited by examiner

HIGH TEMPERATURE INLET DISTRIBUTOR

BACKGROUND

1. Field

Embodiments described herein generally relate to systems and methods for processing materials.

2. Description of the Related Art

Fluidized bed reactors are representative of devices used to perform any number of chemical reactions. Conventionally, fluidized bed reactors include a shell or containment chamber in which a solid granular material (e.g., a catalyst) is deposited. A hot fluid, which can be a fluid, liquid, or mixtures thereof, and which can include entrained particles, is passed through the granular material at a sufficiently high velocity to cause the solids to behave as a fluid.

There is a continuing need for new apparatus and methods for enhancing the fluid and solids interaction in fluidized bed reactors and other situations where fluides and one or more secondary materials are contacted with one another.

SUMMARY

In aspects, the present disclosure provides a system for processing one or more materials. The system may include a processor having a shell defining a chamber. The system also includes a plurality of serially stacked pipe assemblies. Each pipe assembly may include a header having at least one substantially straight pipe section receiving a fluid; and a plurality of nozzles in fluid communication with and projecting downwardly from the header, the plurality of nozzles directing fluid into the chamber of the processor. In arrangements, the plurality of nozzles may be evenly circumferentially distributed around the shell. In further arrangements, the plurality of nozzles may be arranged to form a plurality of axially-spaced apart circumferential sets. In some embodiments, the system may include a dual layer refractory system associated with each of the pipe assemblies.

It should be understood that examples of the more important features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 1:
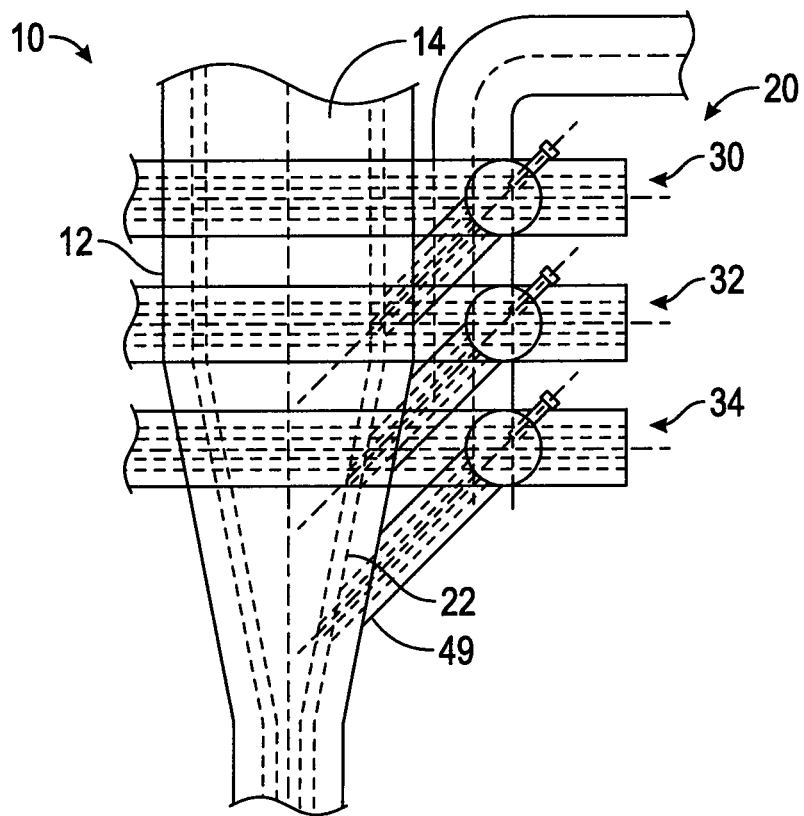
FIG. 1 depicts aside view of processor according to embodiment of the present disclosure.

Referring to FIG. 1, there is shown a processor 10 for processing one or more materials. The processor 10 may include a shell 12 defining a chamber 14. The chamber 14 may include one or more solids (not shown). The chamber 14 is substantially free of plates, metal baffles, or other structures that are positioned to obstruct fluid flow and to promote mixing. Thus, as used herein, the phrase "substantially open" refers to a chamber 14 that does not include mixing structures principally dimensioned, sized, and positioned to cause mixing of fluids and/or solids contained therein. Thus, while structures may project into the chamber 14, these structures do not have a principal purpose of causing mixing.

In accordance with one embodiment of the present disclosure, the processor 10 includes a multi-inlet fluid distributor 20 in order to evenly distribute a high temperature, high velocity fluid into the solids (not shown). The fluid may be a gas having entrained solid particles. In aspects, the fluid has a temperature of at least 1,200 degrees F. In some applications, the fluid has a temperature of at least 2,000 degrees F. In other applications, the fluid as a temperature of at least 3,000 degrees F. The distributor 20 includes a plurality of inlets 22 that distributes the fluid circumferentially and axially into the shell 12. By axially, it is meant that there are inlets 22 are two or more discrete elevations. In some applications, the fluid has a velocity of at least forty feet per second. In other applications, the fluid may have a velocity of at least two hundred feet per second or at least three hundred feet per second.

Figure 2:
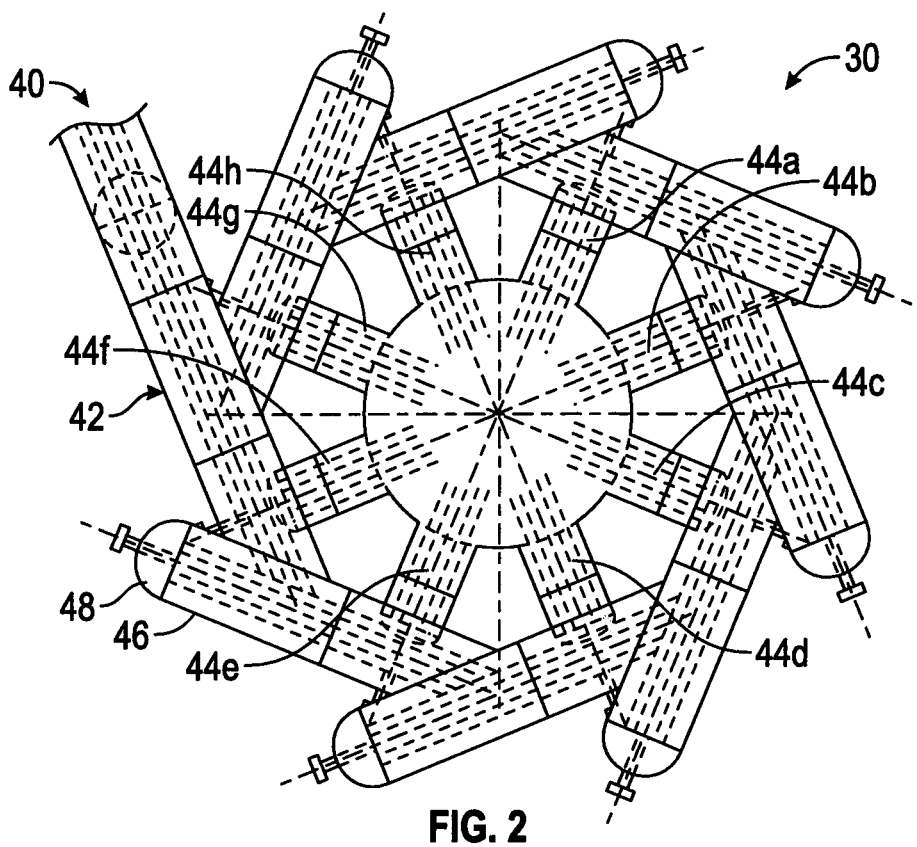
FIG. 2 depicts a top view of a first distributor according to the present disclosure.

In one arrangement, the distributor 20 includes a plurality of pipe assemblies 30, 32, 34. Since the pipe assemblies 30, 32, 34 share common features, only pipe assembly 30 will be described. Referring to FIG. 2, pipe assembly 30 includes a supply inlet 40, a header 42, and inlets formed as a plurality of nozzles 44a-h. The header 42 may be formed in a "pin-wheel" or hexagonal shape and forms the flow channel through which the fluid flows from the supply inlet 40 to the nozzles 44a-h.

The header 42 may include one or more substantially straight pipe segments 46 from which the nozzles 44a-h may project downwards and join at a non-perpendicular juncture 49 with the chamber 14. The angle at the juncture 49 is selected to allow material to flow downward due to gravity into the chamber 14. The downward orientation forces solids to overcome gravity in order to enter the header 42. The header 42 may also include caps 48 that may be removed to allow cleaning implements to be inserted into the straight pipe segments 46. Thus, when needed, devices such as rods may be used to clean clogged pipes.

Figure 5:
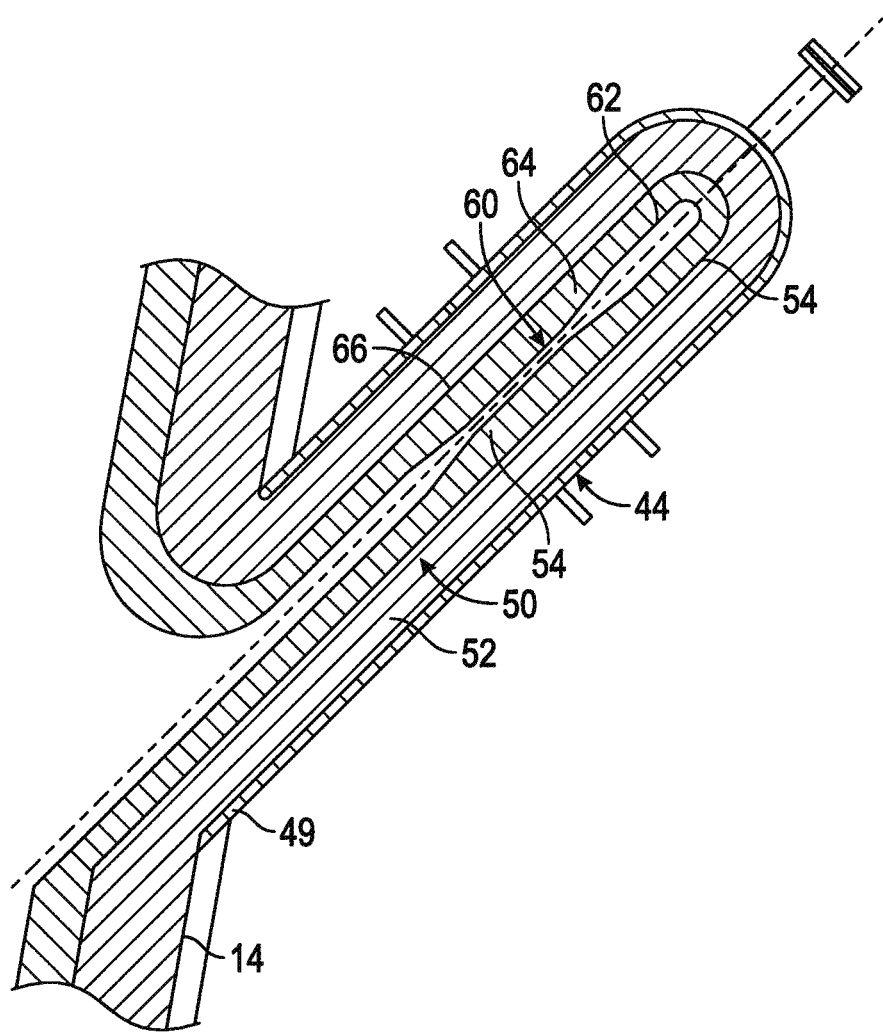
FIG. 5 depicts a sectional view of a nozzle according to the present disclosure.

In embodiments, the distributor 20 may include a dual layer insulating and wear-resistant refractory lining 50 (FIG. 5). The lining 50 may be formed by a first layer of lightweight refractory that is protected on the surface by a second layer of dense refractory. Such a dual layer refractory system may be used to contain the high heat from the fluid in the piping.

The pipe assemblies 32 (FIG. 3) and 34 (FIG. 4) are similar to pipe assembly 20 except for having fewer nozzles.

In one mode of operation, a fluid is supplied to each of the pipe assemblies 30, 32, 34. In each pipe assembly 30, 32, 34, the fluid flows in a circular fashion prior to be flowing downward through the nozzles (e.g., nozzles 44a-h) into the processor 10. As noted above, the nozzles are evenly distributed both axially (vertically) and circumferentially. When the fluid velocity is sufficiently high, the force of the fluid on the solids counter-balances the weight of the solid material. At this point, the contents of the processor bed expand and swirl to form a fluidized bed.

It should be appreciated that these distributed nozzles promote mixing without the use of metal distributors positioned in the chamber 14 of the processor 10. Thus, the fluid may be supplied at temperatures that would otherwise be too hot for such metal distributors.

In contrast to processors that use structures inside the chamber 14 to redirect flow and promote mixing, embodiments of the present disclosure using multiple flow streams, each having different flow directions in order to generate uniform mixing inside the chamber 14. As shown, the nozzles 44a-h are sloped so that the flow is not perpendicular to the vertical axis of the chamber 14. Further, the nozzles 44a-h are all directed radially inward to the vertical axis of the chamber 14. However, in other embodiments, the nozzles 44a-h may induce flow that is perpendicular to this vertical axis. In still other embodiments, the nozzles 44a-h may induce a tangential component to the fluid flow. In still other embodiments, the nozzles 44a-h may point into two or more different directions.

Figure 3:
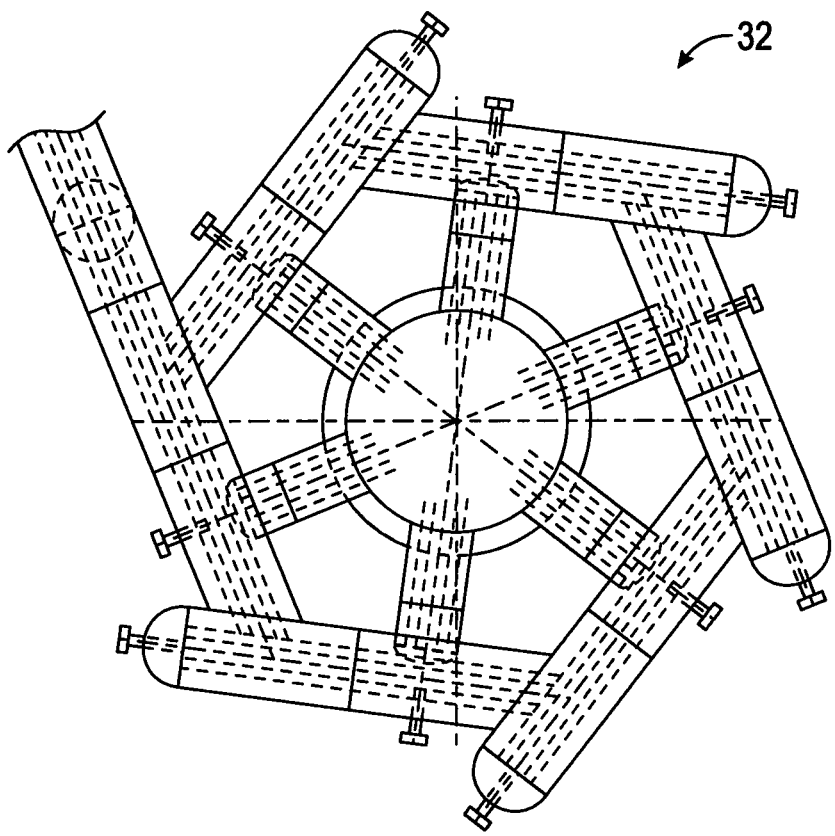
FIG. 3 depicts a top view of a second distributor according to the present disclosure.
Figure 4:
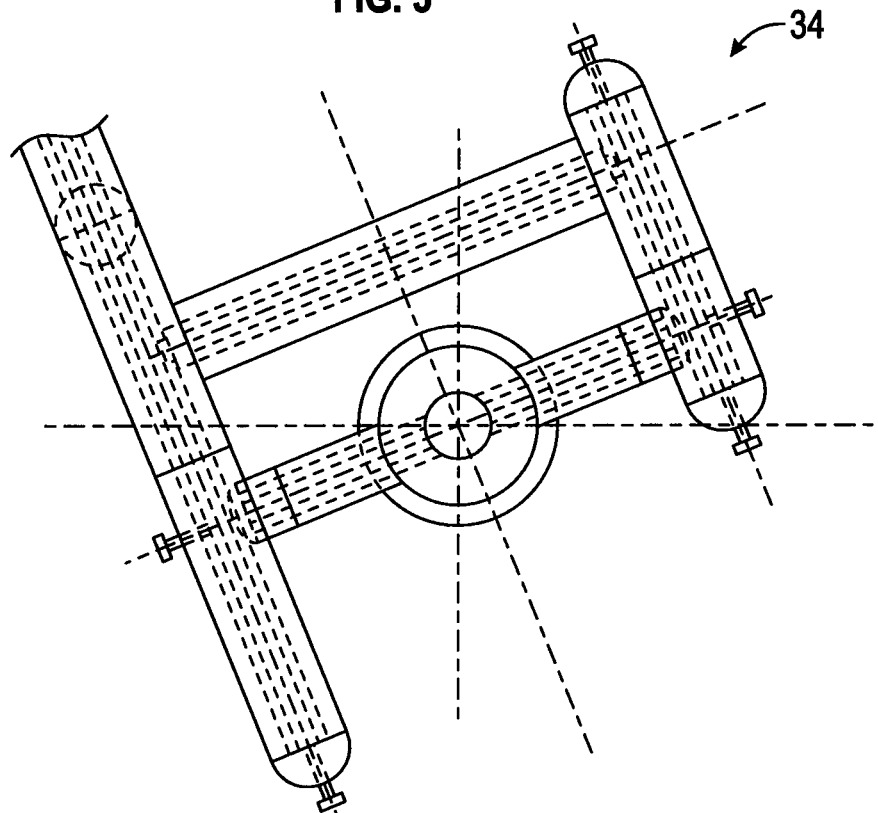
FIG. 4 depicts a top view of a third distributor according to the present disclosure.

As shown, the FIG. 3 and FIG. 4 pipe assemblies have successively fewer nozzles. However, in some arrangements, they could have the same number of nozzles. Also, the number and orientation of the nozzles can vary among the pipe assemblies 30, 32, 34.

Referring now to FIG. 5, there is sectionally shown an illustrative nozzle 44 that is connected to the chamber 14 at a juncture 48. As noted previously, the internal surfaces of the chamber 14 and the distributor 30 may be lined with a multi-layer refractory 50. A first, outer layer 52 is formed of materials that are suitable for containing heat. A second inner layer 54 is formed of materials that are erosion-resistant. Thus, the inner layer 54 provides a physical shield and prevents direct contact between the high-velocity abrasive fluids and the heat-containing outer later 52.

In some embodiments, the nozzle 44 includes a venturi-type of flow restrictor 60. The flow restrictor 60 generates a pressure drop of the fluid flowing into the chamber 14. The magnitude of the pressure drop may be selected to circumferentially and axially equalize the flow of fluid into the chamber 14. As illustrated in FIGS. 1 and 2, the nozzles 44a-h are distributed around the circumference of the chamber 14 and along three discrete elevations. Uncontrolled flow into the chamber 14 could result in uneven flow at these locations. Therefore, some or all of the nozzles 44a-h include the flow restrictor 60 (FIG. 5) in order to generate sufficient back pressure to ensure at least a minimum flow at all of the nozzles 44a-h.

Referring to FIG. 5, in one arrangement, the flow restrictor 60 is cast into the refractory 50. The refractory 50 may have a first flow passage 62, a second flow passage 64, and a third flow passage 66. The venturi effect may be obtained by making the cross-sectional flow area of the second flow passage 64 smaller than the cross-sectional flow area of the first flow passage 62 for a specified axial distance. The third flow passage 66 may have a larger cross-sectional flow area than that of the second flow passage 64. The changes in the cross-sectional area of the flow passages 62, 64, 66 may be obtained by varying the thickness of the inner layer 54 as shown. A similar effect may be obtained by varying the thickness of the outer layer 52.

While the foregoing is directed to embodiments of the present disclosure, other and further embodiments of the disclosure may be devised without departing from the basic scope thereof, and the scope thereof is determined by the claims that follow.

What is claimed is:

1. A system for processing one or more materials, comprising:
   a processor having a shell defining a substantially open chamber, and
   a plurality of serially stacked pipe assemblies, each pipe assembly including:
      a header receiving a fluid, the header having a plurality of straight pipe sections, wherein at least one straight pipe section of the plurality of straight pipe sections includes a cap, the cap being removable to allow a cleaning implement to be inserted into the at least one straight pipe section; and
      a plurality of nozzles in fluid communication with and projecting downwardly from the header, the plurality of nozzles directing the fluid into the chamber of the processor, wherein each straight pipe section includes at least one nozzle.

2. The system of claim 1, wherein the plurality of nozzles each join the shell at a juncture having a non-perpendicular angle, and wherein each nozzle of the plurality of nozzles is directed radially inward to a vertical axis of the chamber.

3. The system of claim 2, wherein the plurality of nozzles are evenly circumferentially distributed around the shell.

4. The system of claim 3, wherein the plurality of nozzles are arranged to form a plurality of axially-spaced apart circumferential sets.

5. The system of claim 1, further comprising a refractory associated with each of the pipe assemblies.

6. The system of claim 5, wherein the refractory is formed in the nozzle and defines a flow restrictor.

7. The system of claim 6, wherein the flow restrictor has at least two flow passages having different cross-sectional flow areas.

8. The system of claim 7, wherein the at least two thicknesses define the different cross-sectional flow areas of the at least two flow passages.

9. The system of claim 1, further comprising:
   a refractory having an outer layer surrounding an inner layer and lining each of the nozzles, wherein the inner layer has a first thickness section defining a first flow passage and a second larger thickness section defining a second flow passage having a smaller cross-sectional flow area than the first flow passage, the first flow passage and the second flow passage defining a flow restrictor;
   wherein the plurality of nozzles are evenly circumferentially distributed around the shell and are arranged to form a plurality of axially-spaced apart circumferential sets, the plurality of nozzles each joining the shell at a juncture having a non-perpendicular angle.

10. A system for processing one or more materials, comprising:
   a processor having a shell defining a substantially open chamber; and
   a plurality of serially stacked pipe assemblies, each pipe assembly including:
      a header receiving a fluid, the header having a plurality of straight pipe sections;
      a plurality of nozzles in fluid communication with and projecting downwardly from the header, the plurality of nozzles directing the fluid into the chamber of the processor, wherein each straight pipe section includes at least one nozzle, and
      a flow restrictor inside each nozzle, the flow restrictor defined by a refractory associated with each of the pipe assemblies, wherein the flow restrictor has at least two flow passages having different cross-sectional flow areas, wherein the refractory has an outer layer and an inner layer, and wherein the different cross-sectional flow areas of the flow restrictor are associated with a change in thickness of at least one of the outer layer and the inner layer.

11. A method for processing one or more materials, comprising:

forming a processor having a shell defining a substantially open chamber; and conveying a fluid having solid particles into the chamber by using a plurality of serially stacked pipe assemblies, each pipe assembly including:

a header receiving a fluid, the header having a plurality of straight pipe sections, wherein at least one straight pipe section of the plurality of straight pine sections includes a cap, the cap being removable to allow a cleaning implement to be inserted into the at least one straight pipe section; and a plurality of nozzles in fluid communication with and projecting downwardly from the header, the plurality of nozzles directing the fluid into the chamber of the processor, wherein each straight pipe section includes at least one nozzle.

12. The method of claim 11, wherein the fluid has a temperature of at least 1,200 degrees F. and a velocity of at least forty feet per second.

* * * * *